Jan. 19, 1943.          J. L. ANDERSON          2,308,850
          COMBINED APPARATUS FOR WELDING AND SIZING TUBES
                     Filed May 7, 1940          3 Sheets-Sheet 1

Jan. 19, 1943.　　　J. L. ANDERSON　　　2,308,850
COMBINED APPARATUS FOR WELDING AND SIZING TUBES
Filed May 7, 1940　　　3 Sheets-Sheet 3

INVENTOR
James L. Anderson
BY
ATTORNEY

Patented Jan. 19, 1943

2,308,850

UNITED STATES PATENT OFFICE 2,308,850

COMBINED APPARATUS FOR WELDING AND SIZING TUBES

James L. Anderson, Closter, N. J., assignor to Air Reduction Company, Incorporated, New York, N. Y., a corporation of New York Application May 7, 1940, Serial No. 333,717

7 Claims. (Cl. 78—87)

This invention relates to apparatus for welding and sizing tubes which are made by pulling furnace-heated skelp through working passes by means of a drawbench.

The force required to bend flat tube material, even when hot, to circular form and bring the edges together is at times sufficient to cause the tongs or other pulling tool to tear loose from the material. Even a preliminary sizing of the tube, if it involves any substantial reduction in diameter, involves too much additional load for ordinary drawbench welding.

It is an object of the invention to provide improved apparatus for making and sizing welded tubes. The invention combines furnace and drawbench welding apparatus with power driving mechanism for one roll stand so that work, such as a reduction in diameter, can be done on the tube in that roll stand without increasing the resistance to the drawbench pull.

Another feature of the invention relates to the coordination of the speed of the drawbench chain and that of the power-driven rolls. In the preferred embodiment of the invention motion-transmitting connections from the drawbench drive the rolls at a rate which propels the tube material at a speed substantially equal to that of the drawbench chain. Any variation in the drawbench speed automatically causes a corresponding change in the roll speed.

Because of the elongation of the tube with any reduction in diameter, the tube material is pulled through the forming apparatus at a speed slower than that of the drawbench chain. For this reason it is advantageous, when using forming or welding rolls, that the rolls ahead of the reducing pass be idlers. In its broader aspects the invention is not limited to forming in rolls, however; a stationary die can be used.

Another object of the invention is to provide improved apparatus for opening simultaneously a plurality of roll passes for inserting a pulling tool laterally into the space between the rolls.

Other objects, features and advantages of this invention will appear or be pointed out as the specification proceeds.

In the accompanying drawings, forming part hereof:

Figure 1:
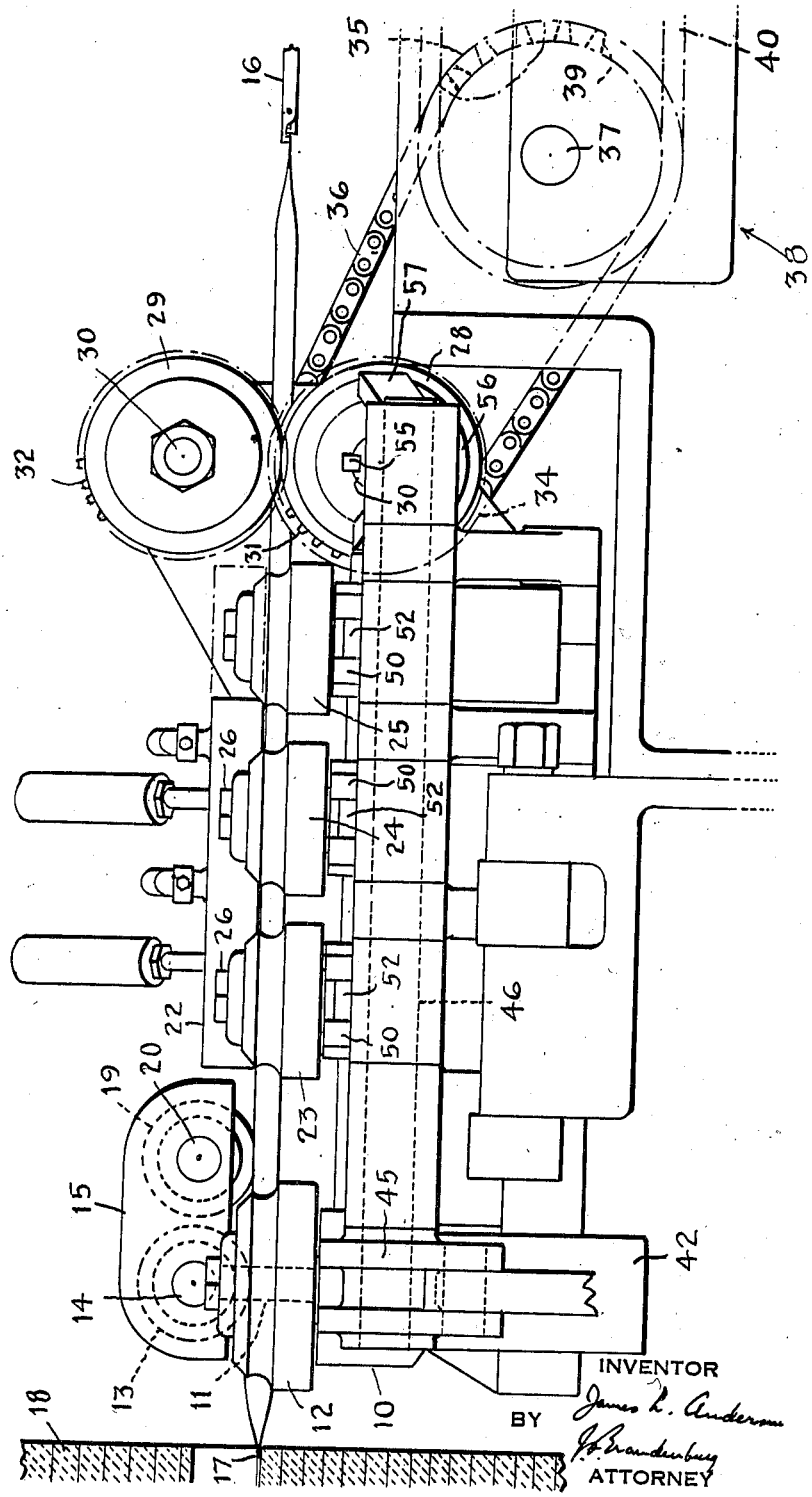
Fig. 1 is a side elevation of tube welding apparatus embodying the invention.

The apparatus includes a frame 10 with upwardly extending axles 11 on which are forming rolls 12. These rolls cooperate with an upper roller 13 to form a roller die. The upper roller 13 turns on an axle 14 in a housing 15.

Figure 3:
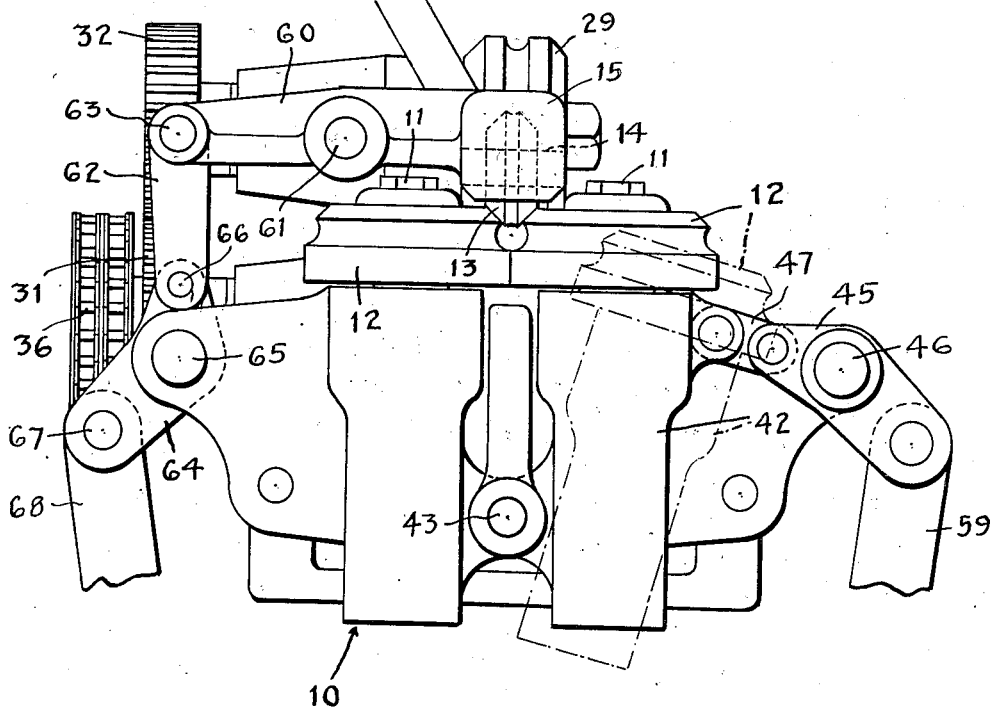
Fig. 3 is an end elevation of the forming, welding, and sizing apparatus of Figs. 1 and 2, looking toward the right.

Tongs 16 are used to pull tube material comprising flat skelp 17 from a furnace 18 through the pass between the rolls 11 and 13 where the skelp is bent to an arcuate horseshoe contour of the shape of the roll pass shown in Fig. 3.

A second top roll 19, best shown in Fig. 1, turns on an axle 20 and gives better control of the shape of the tube blank and the spacing of the seam edges. After passing beyond the forming roll stand, the tube material passes under a torch 22 that projects oxy-fuel gas flames directly against the edge faces of partially-formed tube.

Gathering or holding rolls 23 and 24, located close together and at spaced points along both sides of the portion of the tube blank that is passing under the torch 22, keep the edge faces of the seam in a definite relation to the torch flames. Each of these holding rolls 23, 24 turns on an axle 26 that extends upward from the frame 10.

Rolls 25, on opposite sides of the tube blank and just beyond the holding rolls 24, serve as welding rolls when the torch 22 has the length shown in solid lines, and the final roll pass is used to size the tube. If the torch 22 is longer by the extended portion shown in dotted lines, then the rolls 25 are designed or adjusted to serve as holding rolls in the same manner as the rolls 23, 24 and the welding is done in the next roll pass.

Beyond the torch 22 rolls 28 and 29 are supported from the main frame on horizontal axles 30. The rolls 28 and 29 are connected by spur gears 31 and 32 so that rotation of the lower roll 28 causes the upper roll 29 to rotate at the same speed. The lower roll 28 is connected with a sprocket 34 that is driven from a sprocket 35 through a chain 36. The sprocket 35 is secured to an axle 37 of a drawbench 38. A chain sprocket 39 on the axle 37 supports the drawbench chain 40. Whenever the drawbench chain 40 is in motion, the axle 37 rotates and drives the roll 28 through the chain 36.

The sprockets 34 and 35 are of such size that the roll 28 is rotated at a speed which propels the tube at the lineal speed of the drawbench chain. Because of the drive direct from the drawbench, any change in the speed of the drawbench automatically causes the same change in the speed of the rolls 28 and 29.

For quick and convenient admission of a pulling tool, such as the tongs 16, into the space between the rolls, provision is made for opening all of the roll passes simultaneously. Fig. 3 shows a movable section 42 of the frame 10 connected with the fixed portion of the frame by a pivot 43. The movable frame section 42 can be rocked about the pivot 43 into the dotted-line position shown. The section 42 supports the right-hand axle 11 and roll 12 so that movement of the section 42 into the dotted-line position opens the forming roll pass.

A bell-crank 45 secured to a shaft 46 is connected with the movable frame section 42 by a link 47. This link and the crank form a toggle joint for holding the right-hand roll 12 in working relation with the other rolls that comprise the forming roll stand.

Figure 2:
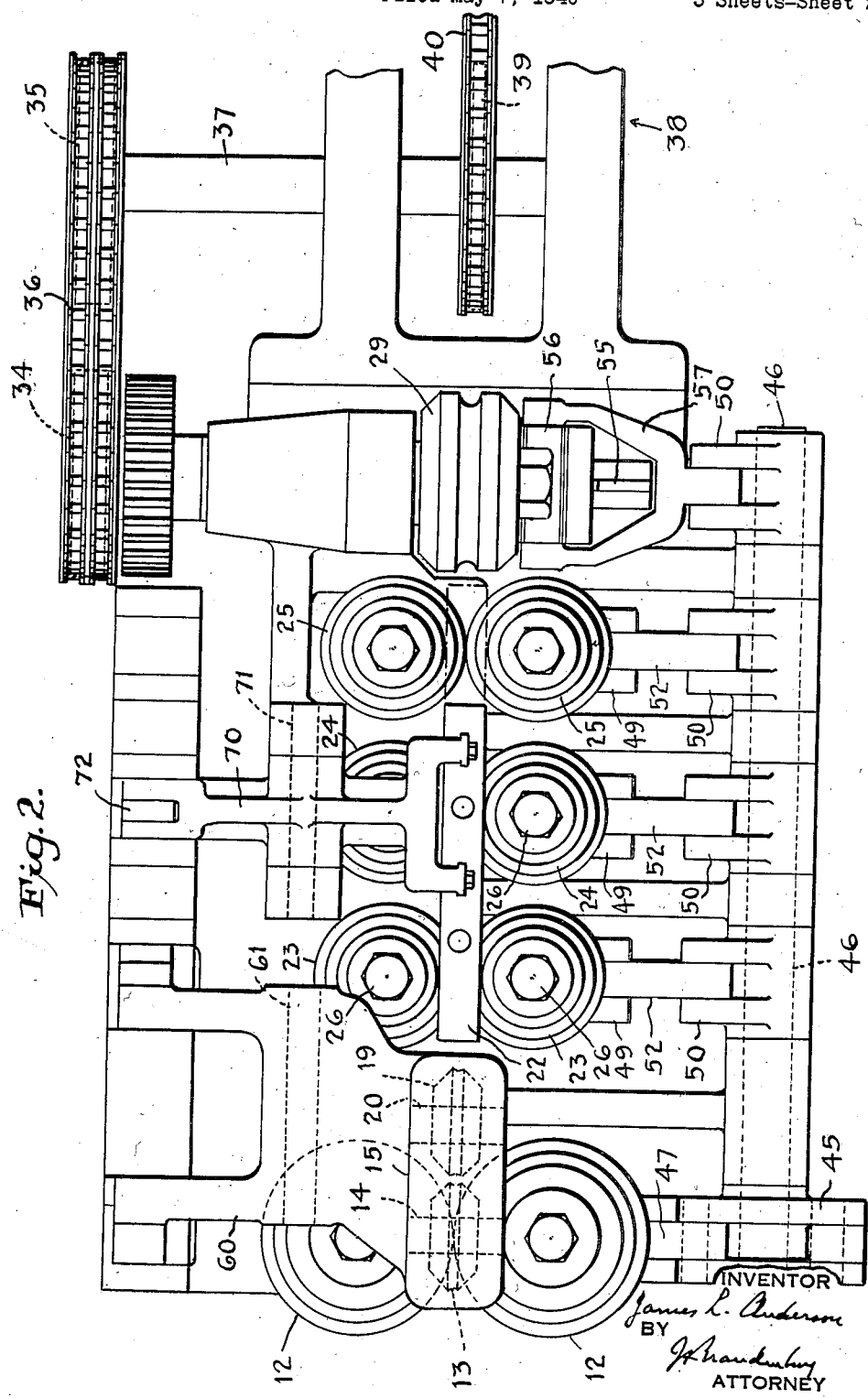
Fig. 2 is a top plan view of the apparatus shown in Fig. 1, without the skelp or pulling tool.

The holding rolls on the right-hand side of the machine, that is the lower rolls 23 and 24 in the plan view (Fig. 2), are supported by movable frame sections 49 similar to the movable section 42. There are cranks 50 secured to the shaft 46 opposite each of the movable frame sections 49. The cranks 50 are the same as the upper crank of the bell-crank 45, and they are each connected with one of the adjacent movable frame sections 49 by a link 52. The right-hand roll 25 is also supported by a movable frame section 49 that is shifted by a crank 50 and link 52 to open the pass defined by the rolls 25.

Figure 4:
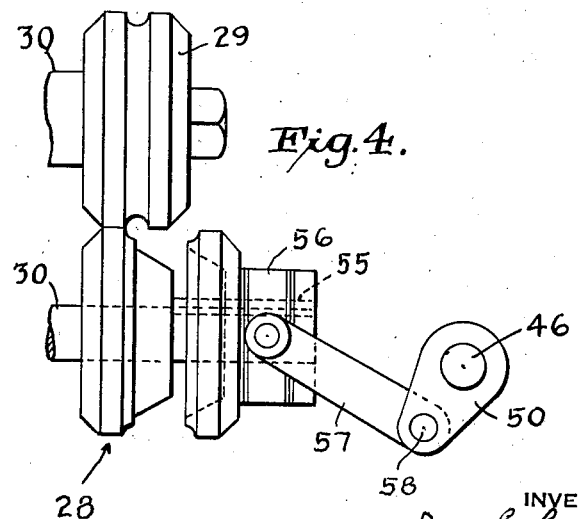
Fig. 4 is a detail view of the rolls of the final roll stand shown in Figs. 1 and 2.

The final roll pass between the rolls 28 and 29 (Fig. 4) is opened by splitting the lower roll 28. The movable half of the roll 28 slides along a key or spline 55 on the axle 30 and is shifted toward and away from the other half of the roll by a throw-out collar 56 connected to a yoke 57. A pivot 58 connects the yoke 57 with one end of the last crank 50 on the shaft 46.

An upward movement of a link 59 connected to the bell-crank 45 turns the shaft 46 and moves the cranks 50 to open all of the roll passes simultaneously.

Although the opening of the roll passes already described is ample for the lateral insertion of a pulling tool, provision is made for further opening of the apparatus in the event that the tube material breaks and a cobble must be removed from the roll passes. Referring again to Fig. 3, the housing 15 is supported by a lever 60 that can be oscillated about a shaft 61 that serves as the fulcrum of the lever. A link 62 is connected with one end of the lever 60 by a pivot 63.

A bell-crank 64 on a shaft 65 is connected at one end to the link 62 by a pivot 66. The other end of the bell-crank 64 is connected by a pivot 67 with an operating link 68. When the link 68 is pulled down it causes the lever 60 to move into the position shown in Fig. 3 and thus closes the forming roll pass. When the link 68 is pushed up it moves the bell-crank 64 and link 62 so as to rock the lever 60 counter-clockwise about the shaft 61 and thereby opens the top of the forming roll pass.

The torch 22 (Fig. 2) is supported by a lever 70 that rocks about a shaft 71 in alinement with the shaft 61. The lever 70 is moved about the shaft 71 as a fulcrum by a link 72 connected with a crank secured to the shaft 65 and similar to the upper portion of the bell-crank 64 shown in Fig. 3.

The invention is not limited to the embodiment illustrated and some features can be used without others.

I claim:

1. Tube making apparatus including a plurality of roll stands for forming and welding, and a sizing roll stand beyond the forming and welding roll stands and in which the diameter of the tube is reduced, a drawbench beyond the sizing roll stand for pulling the tube material through the forming and welding roll stands, and mechanism for causing the sizing rolls to rotate and relieve the drawbench of the resistance encountered in the sizing operation, said mechanism including means correlating the drive of the drawbench and sizing rolls so that the tube beyond the sizing rolls is advanced by the thrust of said sizing rolls at substantially the speed of the drawbench.

2. The combination of a plurality of roll stands for forming and welding a tube, a drawbench by which the tube material is pulled through the forming and welding roll passes, power driving mechanism for the drawbench, and means for assisting the drawbench pull including motion-transmitting connections between said driving mechanism and the rolls of the last roll stand, and only the last roll stand, said connections being constructed and arranged to correlate the speed of the drawbench and of the rolls of said last stand so that the tube beyond said last stand is advanced by the thrust of the rolls of the last stand at substantially the speed of the drawbench.

3. Apparatus for making welded tubes including a plurality of successive roll stands in which skelp is formed and welded, said stands including a final roll pass that works the tube to reduce its diameter, a drawbench for pulling lengths of skelp through said roll stands, power driving connections between the drawbench and the rolls of the final roll stand, and edge heating means in position to project high-intensity heating flames directly against the separated edge faces of the partially-formed tube between the first forming roll stand and the region where the edge faces come together to make the weld, the length and intensity of said heating means being correlated with the drawbench speed, with compensation for the reduced speed past the heating means caused by the diameter reduction in the final roll pass, so that the separated edge faces of the tube blank are heated to welding temperature by the time they are brought together to make the weld.

4. The combination of a drawbench and forming and welding rolls defining passes through which the drawbench pulls tube material, said rolls being divided among a plurality of stands with the rolls of the final stand constructed and arranged to reduce the size of the tube, means for reducing the resistance encountered by the drawbench including a power drive for the final roll stand and means for synchronizing the drawbench speed and the speed at which the rolls of said final roll stand propel the reduced portion of the tube toward the drawbench.

5. The combination of a plurality of roll stands having passes through which tube material travels and in which said material is formed, welded, and subjected to a preliminary sizing, means for opening each of the roll passes to admit a pulling tool laterally into the space between the rolls, said means including movable supports for the corresponding rolls of a number of said roll stands, and a single control member for causing all of the opening means to operate simultaneously.

6. In tube making apparatus, a plurality of roll stands in which work is done on a traveling skelp or tube blank, heating means located above the seam edges along a run of the tube blank, gathering or holding rolls in contact with the sides of the tube blank intermediate the ends of the heating means for confining the tube blank where it passes under said heating means, means for opening each of the roll passes to admit a pulling tool laterally into the space between the rolls, and means for shifting the heating means clear of the space between the holding rolls.

7. Apparatus for forming, welding, and sizing tube material including in combination a furnace in which the tube material is heated in a flat condition, one or more forming roll stands with idler rolls that bend the flat material into a partially-formed tube with separated edges along the seam, an oxy-fuel gas torch positioned above the separated edges of the tube blank in position to project flame jets against the edge faces of the traveling tube blank, gathering or holding rolls in contact with the bottom and sides of that portion of the tube blank that is under the heating torch and intermediate the ends of the heating torch, a welding roll stand, and a final roll stand with two or more rolls defining a sizing roll pass in which the welded tube is reduced in diameter, a drawbench for pulling the tube material from the furnace and through the various roll passes, mechanism for driving the sizing rolls to relieve the drawbench of at least a part of the load incident to the diameter reduction, said mechanism including motion-transmitting connections between the sizing rolls and a driven element of the drawbench, and means for moving rolls of the forming and welding roll passes to obtain a clearance through which a pulling tool can be inserted laterally into the space between the rolls.

JAMES L. ANDERSON.